Nov. 12, 1940.　　　R. A. SANDBERG　　　2,221,203
AUTOMOBILE JACK SUPPORTING BASE
Filed Aug. 5, 1939
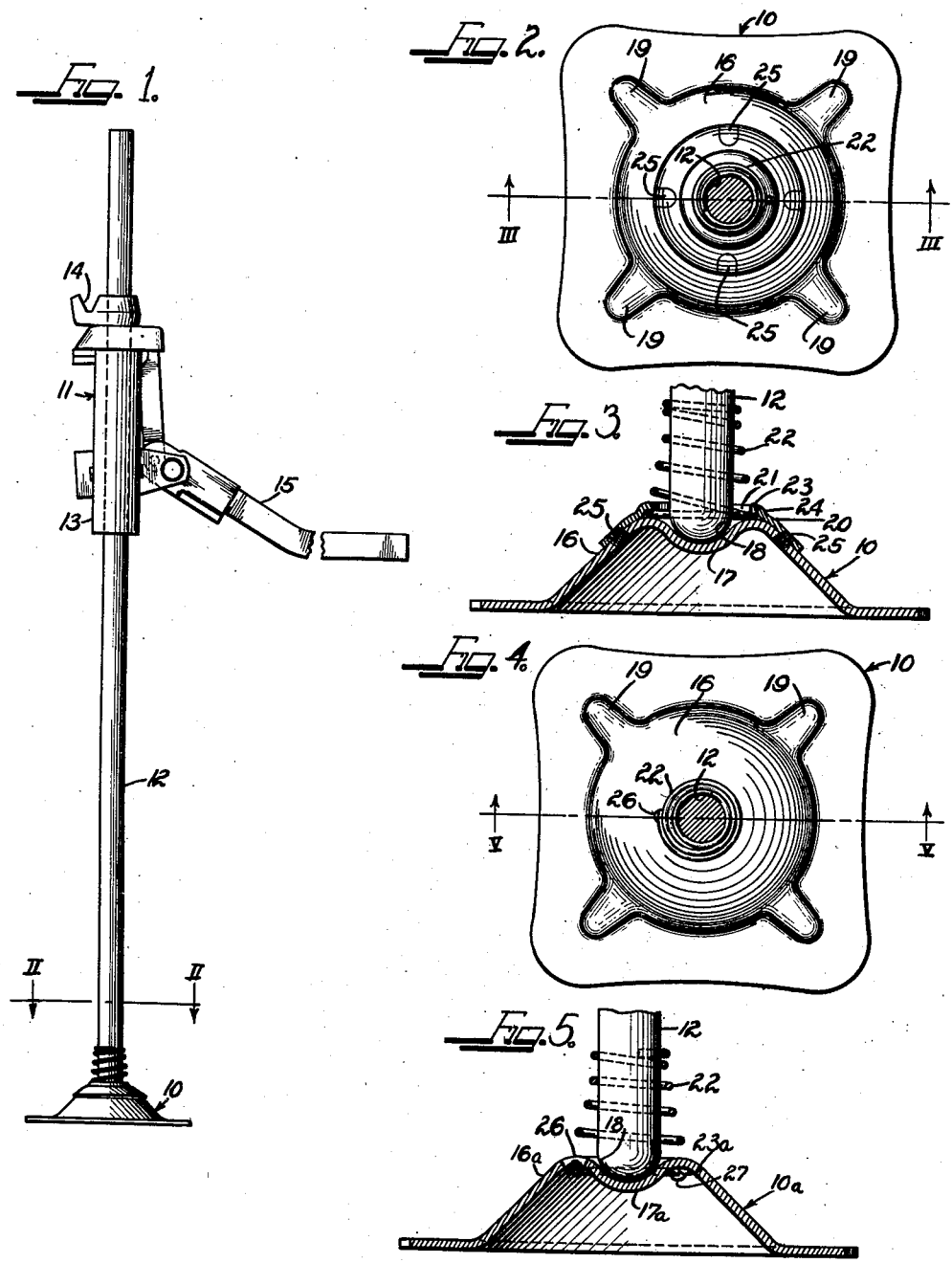
Inventor
RAY A. SANDBERG Patented Nov. 12, 1940

2,221,203

UNITED STATES PATENT OFFICE 2,221,203

AUTOMOBILE JACK SUPPORTING BASE

Ray A. Sandberg, Waukegan, Ill., assignor to Houdaille-Hershey Corporation, Detroit, Mich., a corporation of Michigan Application August 5, 1939, Serial No. 288,517

1 Claim. (Cl. 248—160)

This invention relates to a supporting base for automobile jacks of the type employing a standard.

More specifically the invention relates to an automobile jack supporting base which removably and flexibly supports the jack standard.

While the invention will hereinafter be specifically described for use with automobile jacks, it should be understood that the invention is not limited to such use and that the patent to be granted on the invention is intended to cover any jack of the type having longitudinal standards.

It is not often possible, in subjecting parts of an automobile to lifting pressure by a jack that the part or parts to be lifted will raise vertically in relation to the jack supporting base. This is so, either because the supporting surface for the jack is not level or because the part or parts of an automobile to be raised fulcrum about an axis angularly removed from the working axis of the jack.

In either case, if a rigid supporting base is used, the jack must be so made structurally as to resist bending when the positions of the jack, the supporting surface and the part to be raised are not normal, each to the other. Too often this results in the jack slipping out of place allowing a lifted portion of an automobile to drop to the ground and possibly resulting in injury to the person working under or near the car. In other cases, such as when parts of an automobile have been removed, like wheels, the disengagement of the jack may result in extreme difficulty in relifting the car.

One of the important objects of the invention, then, is to provide a base which will flexibly support a jack standard angularly to its normal position.

Another object of the invention is to provide a supporting base for a jack which will angularly support a jack standard without the base moving relative to its supporting surface.

Still another object of this invention is to provide a supporting base for jacks which will allow angular displacement of the jack standard relative to the base to eliminate the need of providing a heavy jack structure to resist bending.

Yet another object of this invention is to provide a jack supporting base which will allow for lifting of loads angularly displaced relative to said base.

Another object of the invention is to provide a jack supporting base which will removably and flexibly support a jack standard in a normal position when not forced to assume an angular position.

Other and further objects of the invention will become apparent to those skilled in the art from the following detailed description of the annexed sheet of drawings which discloses a preferred and a modified embodiment of the invention.

On the drawing:

Figure 1 is a side elevation of an automobile jack supported in a base according to this invention.

Figure 2 is a horizontal section taken along the line II—II of Figure 1 showing the top view of the jack supporting base according to one form of this invention.

Figure 3 is a vertical cross-sectional view, taken along the line III—III of Figure 2 with parts in elevation.

Figure 4 is a view similar to that of Figure 2, showing a top view of the jack supporting base according to another form of this invention.

Figure 5 is a vertical cross-sectional view, taken along the line V—V of Figure 4, with parts in elevation.

As shown on the drawing:

As shown in Figure 1, the reference numeral 10 designates generally a jack supporting base according to this invention. The reference numeral 11 designates generally a jack which comprises a standard 12, an operating cage 13, a load carrying member 14, and an operating lever 15. One end of the standard 12 is removably retained within the base 10 which will be described in detail hereafter.

Figures 2 and 3 illustrate one form of my invention. As clearly shown in Figure 2, the base 10 is generally a square flat metal sheet. The center portion of the base 10 is bulged outwardly to form a dome-like portion 16, as best shown in Figure 3. A pocket recess 17 is provided in the top of the dome 16, so shaped to provide a seat for the rounded end 18 of the jack standard. Embossed ribs 19 extend from the dome 16 into the flat portion of the base to give added strength against the dome collapsing under pressure.

A cap 20 is shaped to seat on the top portion of the dome 16. This cap is provided with a central aperture 21 of sufficient diameter to allow the standard 12 to be rotated angularly while seated in the recess 17. A coil spring 22, having one end larger in diameter than the cap aperture 21, is inserted therethrough. The free end 23 of the coil spring 22 is bent upwardly to engage within a recess 24 provided in the wall of the cap 22 defining the aperture 21.

The combination cap and coil spring is then seated on the dome 16 so that the aperture 21 is in concentric relation to the recess 17. In this position, the cap is spot-welded to the dome, as at points 25. Thus the coil spring 22 is anchored to the dome 16 but remains flexible angularly thereto.

As disclosed in Figures 3 and 5, the other end of the coil spring 22 has an inside diameter which is smaller than the diameter of the jack standard 12. When the latter is inserted through the spring to seat in the recess 17 the spring coils are expanded to tightly grip the standard. As thus seated, the standard is tightly though flexibly coupled to the base allowing the jack and base to be positioned relative to the load without the parts becoming detached. This provision is highly desirable as a jack and base of the type disclosed herein may be assembled by the vehicle operator before they are placed beneath the automobile, and by using the standard of the jack as a handle the operator can reach under the vehicle and place the base in any position desired without having the base uncouple from the standard. The load-carrying member can then be guided into engagement with the load by using the operating lever of the jack as a handle. This provision eliminates the necessity of the operator kneeling on the ground to place the jack in position.

As thus removably seated, the standard 12 is retained in a normal position relative to the base 10. However, the spring is flexible to allow the standard, while still seated, to be angularly displaced without unseating the standard or moving the base relative to its supporting surface.

While the two or three top coils of the free end of the spring 22 is preferably of smaller diameter than the standard 12, as shown in Figures 3 and 5, any number of coils thereof may be of such smaller diameter as deemed necessary depending upon the length and tightness of the coupling desired.

Thus a jack, of the type illustrated, may be seated in its supporting base and the load carrying element urged against a load in an angular direction relative to the base without tilting or moving the base in relation to its supporting surface.

Figures 4 and 5 illustrate another embodiment of my invention. Parts similar to those of Figures 2 and 3 carry the same reference numerals. The reference numeral 10a designates a supporting base substantially shaped in the manner of base 10 of Figure 3. The dome portion 16a is provided with a recess 17a and an aperture 26 through the crown thereof at the outer edge of the detent. Embossed ribs 19 extend from the dome to the base to support the dome against collapsing when under pressure. The large end of the coil spring 22 is threaded through the aperture 26 a distance of approximately one-half a turn of the spring. The free end 23a of the spring is welded to the underside of the dome 16a, as at point 27.

Thus the spring 22 is fixedly secured at one end thereof to the base 10a and extends upwardly away therefrom to retain its flexibility. This eliminates the cap 20 as illustrated in Figure 3.

The opposite end of the coil spring 22 has a diameter sufficiently large to removably retain the standard 12 in a normal position relative to the base when seated in the recess 17a. It also allows for angular movement relative to its normal position without unseating the rounded end 18 of the jack standard 12.

This embodiment of my invention, like that disclosed in Figure 3, permits a jack of the type illustrated to be seated in its supporting base and the load carrying element urged against a load in an angular direction relative to the base without tilting or moving the base in relation to its supporting surface.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A support structure for an automobile jack having a standard for supporting adjustable load-carrying parts which comprises a one-piece base shaped to provide a flat supporting portion and a dome-like bulged portion extending outwardly therefrom, embossed ribs between the flat and dome-like bulged portions of said base, a concave recess in the top of said dome-like portion formed to complementally receive one end of said standard, an apertured cap shaped to be seated on said bulged portion in concentric relation with said recess, means for securing said cap to said bulged portion, and a coil spring having one end confined between said cap and bulged portion and extending through the aperture in said cap to removably and flexibly connect said standard and base.

RAY A. SANDBERG.